(12) United States Patent
Luo et al.

(10) Patent No.: US 8,661,450 B2
(45) Date of Patent: *Feb. 25, 2014

(54) DEADLOCK DETECTION FOR PARALLEL PROGRAMS

(75) Inventors: Zhi D. Luo, Beijing (CN); Yao Qi, Beijing (CN); Yong Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,339

(22) Filed: Apr. 2, 2012

(65) Prior Publication Data

US 2012/0198460 A1  Aug. 2, 2012

Related U.S. Application Data

(63) Continuation of application No. 12/826,759, filed on Jun. 30, 2010.

(30) Foreign Application Priority Data

Jun. 30, 2009  (CN) .......................... 2009 1 0139821

(51) Int. Cl.
*G06F 9/46* (2006.01)
(52) U.S. Cl.
USPC ........... 718/106; 718/103; 717/152; 717/153; 717/156
(58) Field of Classification Search
USPC ......................... 717/101–178; 718/101–108
See application file for complete search history.

(56) References Cited

U.S. PATENT DOCUMENTS

| | | | | |
|---|---|---|---|---|
| 5,784,556 A * | 7/1998 | Sanchez et al. | ............... | 709/248 |
| 6,715,146 B1 * | 3/2004 | Simmons et al. | ............. | 718/104 |
| 7,065,763 B1 * | 6/2006 | Martin et al. | .................. | 718/102 |
| 7,152,157 B2 * | 12/2006 | Murphy et al. | ............... | 713/100 |
| 7,844,946 B2 * | 11/2010 | Wu et al. | ........................ | 717/119 |
| 2006/0070076 A1 * | 3/2006 | Ma | ................................. | 718/104 |
| 2007/0150897 A1 | 6/2007 | Leeman, Jr. | | |

(Continued)

FOREIGN PATENT DOCUMENTS

| | | |
|---|---|---|
| EP | 0457473 A2 | 11/1991 |
| EP | 0235525 B1 | 7/1995 |
| WO | 2008137688 A1 | 11/2008 |

OTHER PUBLICATIONS

Rutar et al., "A Comparison of Bug Finding Tools for Java", Proceedings of the 15th International Symposium on Software Reliability Engineering, 2004, pp. 245-256.

(Continued)

*Primary Examiner* — David Rines
(74) *Attorney, Agent, or Firm* — Yee & Associates, P.C.; David A. Mims, Jr.

(57) ABSTRACT

A deadlock detection method and computer system for parallel programs. A determination is made that a lock of the parallel programs is no longer used in a running procedure of the parallel programs. A node corresponding to the lock that is no longer used, and edges relating to the lock that is no longer used, are deleted from a lock graph corresponding to the running procedure of the parallel programs in order to acquire an updated lock graph. The lock graph is constructed according to a lock operation of the parallel programs. Deadlock detection is then performed on the updated lock graph.

7 Claims, 8 Drawing Sheets

(56) References Cited

U.S. PATENT DOCUMENTS

2007/0271570 A1* 11/2007 Brown et al. .................. 718/105
2010/0198799 A1* 8/2010 Krishnan et al. .............. 707/702
2010/0235817 A1* 9/2010 Kahlon et al. ................. 717/126
2010/0333110 A1 12/2010 Luo et al.

OTHER PUBLICATIONS

Eugster, "Java Virtual Machine with Rollback Procedure allowing Systematic and Exhaustive Testing of Multi-threaded Java Programs", Mar. 31, 2003, Formal Methods Group, Computer Science Institute, ETH Zurich, pp. 1-175.

IBM, alphaWorks Community, "A cross-platform tool that provides an insight into how well Java locks are performing in a live Java application", 1 page, [retrieved from internet on May 27, 2010] http://www.alphaworks.ibm.com/tech/jla.

McGehee, "How to Track Down Deadlocks Using SQL Server 2005 Profiler", Jun. 20, 2008, Simple-Talk.com, pp. 1-10.

"SQL Server technical bulletin—How to resolve a deadlock", pp. 1-8, retrieved May 27, 2010 http://support.microsoft.com/kb/832524.

CN office action (Chinese and English translation) dated May 18, 2012 regarding application CN200910139821.2, 4 Pages.

USPTO Office Action, dated Oct. 18, 2012, regarding U.S. Appl. No. 12/826,759, 18 pages.

Final Office Action, U.S. Appl. No. 12/826,759, Jun. 26, 2013, 14 pages.

* cited by examiner

DEADLOCK DETECTION FOR PARALLEL PROGRAMS

This application is a continuation of and claims the benefit of priority to U.S. patent application Ser. No. 12/826,759, filed on Jun. 30, 2010 and entitled "Deadlock Detection Method and System for Parallel Programs" which claims the benefit of priority to Chinese Patent Application Serial No. 200910139821.2, filed on Jun. 30, 2009 and entitled "Deadlock Detection Method of Parallel Programs and System", published as CN 101937365 A on Jan. 5, 2011, which are hereby incorporated by reference.

BACKGROUND

1. Field:

The present invention relates to parallel programs, more particularly to a deadlock detection method and system for parallel programs.

2. Description of the Related Art

With the rapid development of computer technology, a single-core processor is gradually replaced by a multi-core processor. The multi-core processor significantly improves processing capability and computing capability of a computer, and sufficiently presents the advantage of parallel computing by integrating a plurality of execution cores into one physical processor. So called parallel computing comprises time parallel and space parallel processing, in which the time parallel is related with pipeline technology while the space parallel is related with the parallel technology performed by multiple processors. Generally, parallel computing is implemented by parallel programs in which processing of a task is separated into multiple portions (threads) and these threads can be executed in parallel, and they can communicate with each other by accessing shared data structures and using proper synchronization methods so as to work cooperatively and correctly.

However, process (thread) deadlock is a vital problem for parallel programs. Process (thread) deadlock is a situation wherein two or more processes (threads) are waiting for the other to finish due to a competing shared resource during execution, and two transactions in deadlock will wait indefinitely unless one process (thread) in deadlock gives up the shared resource. Generally, process (thread) deadlock will result in a breakdown of the whole system. There are a lot of factors that will trigger process (thread) deadlock, mainly including: (1) limited system resource; (2) improper order of processes (threads) execution; and (3) unsuitable resource allocation. If system resources are abundant and the parallel processes' requests for resources can all be met, the possibility that a deadlock occurs is low. Otherwise, a deadlock may occur due to competing limited resources. Further, the order and speed of advancement of process execution is different, which may also cause deadlock. In order to avoid damage on the system due to process (thread) deadlock and improve stability of the system, there is a need for an efficient method to detect deadlock such that process (thread) deadlock can be found in time and proper measures can be taken to release the deadlock, thereby preventing the operational condition of the system from further deterioration.

Typically, a lock graph is utilized to intuitively represent a deadlock condition. A lock graph corresponds to a running procedure of parallel programs that may be acquired by recording lock operations in the running procedure of the parallel programs, and nodes and directed edges are accordingly added in the lock graph. In the lock graph, a node denotes a lock for resource, and a directed edge pointing from one node to another denotes that a process holding a lock is requesting to acquire a lock of another resource. If directed edges between two or more nodes in a lock graph form a closed directed loop, there is a deadlock in the parallel programs, and thus deadlock can be detected by checking whether there is a directed loop in the lock graph. FIG. 1 shows a diagram of deadlock state of parallel programs, in which thread T1 has acquired a lock of resource R1 and requests a lock of resource R2, thread T2 has the lock of resource R2 and requests the lock of resource R1. Both threads need to acquire the resource held by the other thread for further processing. However, the resources held by T1 or T2 will not be released until the other thread releases its resources, and thus they fall in a deadlock state.

However, in practice, it is not very efficient to apply the above approach in deadlock detection since, as the program runs, more and more nodes and edges are added into the lock graph. FIG. 2 shows an example of a lock graph of parallel programs in which there are 1014 nodes and 3051 directed edges, and the operation of detecting directed loop in the lock graph is very slow, thereby consuming large amounts of time and computing resources, and greatly reducing efficiency of deadlock detection.

Thus, there is a need for an improved deadlock detection method to enhance efficiency of deadlock detection.

SUMMARY

In view of the above problems, the present invention provides a deadlock detection method and system for parallel programs.

According to an aspect of the invention, there is provided a deadlock detection method for parallel programs, comprising: determining that a lock of the parallel programs is no longer used in a running procedure of the parallel programs; deleting a node corresponding to the lock that is no longer used, and edges relating to the lock that is no longer used, from a lock graph corresponding to the running procedure of the parallel programs in order to acquire an updated lock graph, wherein the lock graph is constructed according to a lock operation of the parallel programs; and performing deadlock detection on the updated lock graph.

According to an aspect of the invention, there is provided a deadlock detection system for parallel programs, comprising: a determining means configured to determine that a lock of the parallel programs is no longer used in a running procedure of the parallel programs; a lock deleting means configured to delete a node corresponding to the lock that is no longer used, and edges relating to the lock that is no longer used, from a lock graph corresponding to the running procedure of the parallel programs in order to acquire an updated lock graph, wherein the lock graph is constructed according to a lock operation of the parallel programs; and a deadlock detection means configured to perform deadlock detection on the updated lock graph.

With a deadlock detection method and system for parallel programs provided in the present invention, nodes of locks that are no longer used, and their related edges, are deleted from the lock graph of parallel programs in time, thereby efficiently reducing complexity of the lock graph by reducing large amounts of nodes and edges. Directed loop detection is then done based on pruned lock graph, which can save a large amount of time and computing resources, and thus greatly improve the efficiency of deadlock detection.

BRIEF DESCRIPTION OF THE SEVERAL VIEWS OF THE DRAWINGS

The invention itself, preferred mode of use, objects and advantages thereof will be better understood from the following detailed description of exemplary embodiments, in conjunction with accompanying drawings, in which:

FIG. 4b shows a lock graph after nodes of mutual exclusive lock request_mutex and edges related to the mutual exclusive lock request_mutex are deleted from the lock graph of FIG. 4a;

FIG. 5b shows a lock graph after nodes of lock G and edges related to lock G are deleted from the lock graph of FIG. 5a;

FIG. 6b shows a lock graph after nodes of lock G and edges related to lock G are deleted from FIG. 6a;

DETAILED DESCRIPTION

Figure 1:
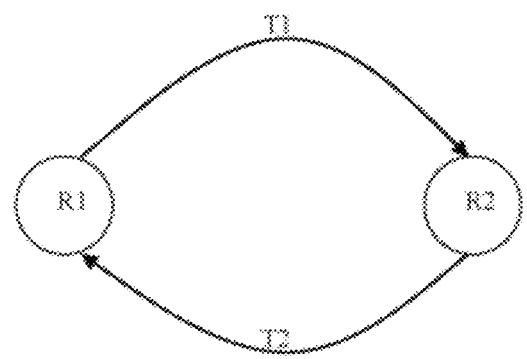
FIG. 1 shows a diagram of a deadlock state of parallel programs.
Figure 2:
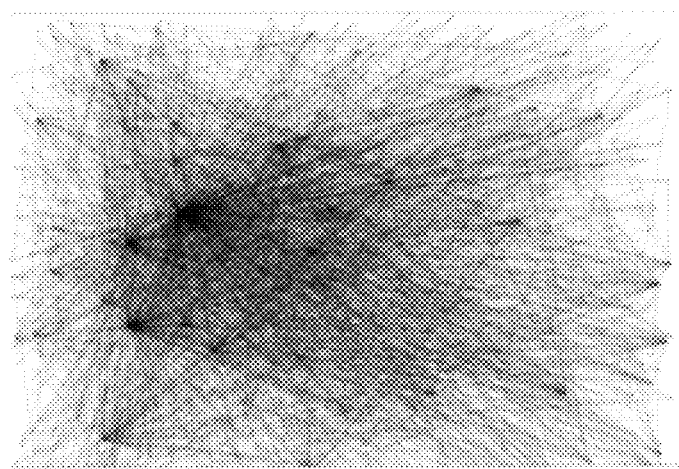
FIG. 2 shows an example of a lock graph of parallel programs.
Figure 3:
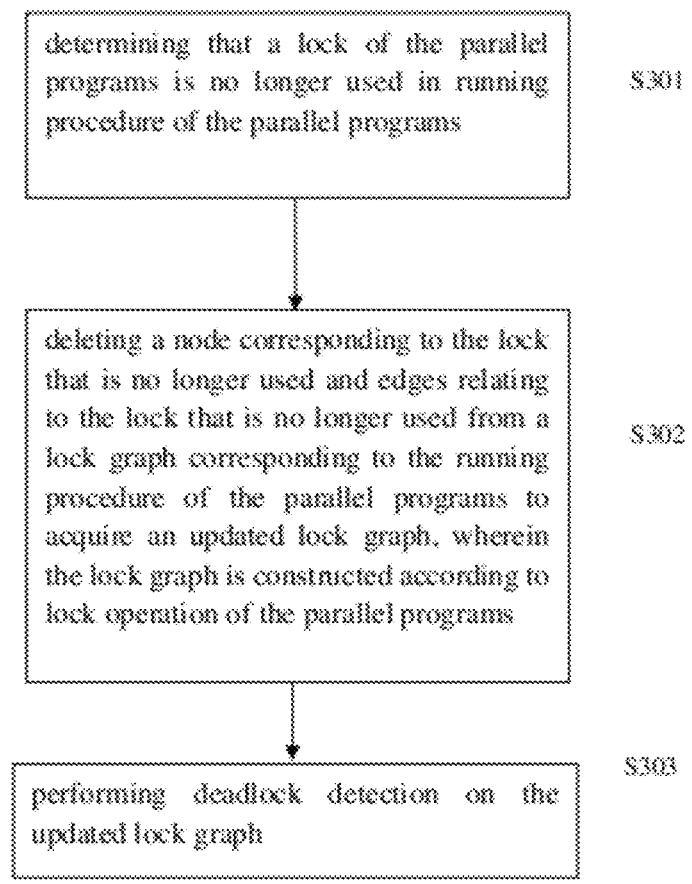
FIG. 3 shows a deadlock detection method for parallel programs according to an embodiment of the present invention.

The deadlock detection method and system for parallel programs according to embodiments of the present invention are described below in connection with the corresponding drawings. FIG. 3 shows a deadlock detection method for parallel programs according to an embodiment of the present invention, comprising: in step S301, it is determined that a lock of the parallel programs is no longer used in the running procedure of the parallel programs; in step S302, a node corresponding to the lock that is no longer used, and edges relating to the lock that is no longer used, are deleted from a lock graph corresponding to the running procedure of the parallel programs in order to acquire an updated lock graph, wherein the lock graph is constructed according to a lock operation of the parallel programs; and in step S303, deadlock detection is performed on the updated lock graph.

Specifically, in step S301, wherein determining that a lock of the parallel programs is no longer used in a running procedure of the parallel programs, further comprises: in response to receiving event notifications that a lock of the parallel programs is no longer used, it is determined that the lock of the parallel programs is no longer used.

Determining that a lock of the parallel programs is no longer used in a running procedure of the parallel programs further comprises: a lifecycle of the lock of the parallel programs is analyzed by scanning code of the parallel programs.

According to one embodiment of the present invention, analyzing a lifecycle of the lock of the parallel programs further comprises: detecting a location where the lock of the parallel programs is finally used in the running procedure of the parallel programs in response to detecting that there is an explicit function call in the parallel programs to destroy the lock, and marks are added in the vicinity of location that the lock of the parallel programs is finally used. The marks are used to trigger, in the running procedure of the parallel programs, event notifications that the lock of the parallel programs is no longer used. For example, in Linux, multi-thread application program often uses a mutual exclusive lock Mutex provided by pthread library, and a function that destroys a lock is int pthread_mutex_destroy (pthread_mutex_t*mutex); while a semaphore used to achieve mutual exclusive by multi-process is also a special lock, and a function that destroys a lock is int semctl(int semid, int semnum, IPC_RMID, . . . ).

According to one embodiment of the present invention, analyzing a lifecycle of the lock further comprises: identifying a set of locations where the lock of the parallel programs may be finally used in the running procedure of the parallel programs. Specifically, in response to detecting that there is no explicit function call in the parallel programs to destroy a lock, a data stream of the parallel programs is analyzed, and a set of locations where the lock of the parallel programs is defined and used are determined, so as to identify the set of locations where the lock of the parallel programs may be finally used during the running procedure of the parallel programs. A mark is added near the location that the lock of parallel programs may be finally used, where the marks are used to trigger an notification event that the lock of parallel programs may no longer be used during the running procedure of the parallel programs; and in response to receiving the notification event triggered by the mark, it is determined that the lock of the parallel programs are no longer used.

According to one embodiment of the present invention, a static code analysis method can be used to analyze a lifecycles of lock of parallel programs, and the static code analysis performs a code check without executing the code (e.g. perform source code check, binary code check or byte code check). Static code scan is a primary step of static code analysis, and examples of performing static code analysis with respect to multi-thread parallel programs with and without an explicit function call that destroys a lock are listed below. In order to facilitate understanding, each of the following embodiments utilizes static analysis for source code.

First Embodiment

An example of static code analysis on a c language program example1.c with an explicit function call to destroy a lock is shown below, in which the c language program example1.c contains the mutual exclusive lock Mutex in pthread library of Linux, and a function that destroys the mutual exclusive lock Mutex is: int pthread_mutex_destroy (pthread_mutex_t*mutex); static code analysis needs to scan source code of example1.c without executing the code, identify function code that matches the Mutex destroying function, identify locations that the lock is finally used in the running procedure of parallel programs, and add a mark in the vicinity of these locations to trigger an notification event that the lock is destroyed during running procedure of parallel programs.

```
 1 : #controller thread, named as T1
 2 : #include <pthread.h>
 3 :
 4 : pthread_mutex_t list_mutex;
 5 : pthread_mutex_t request_mutex;
 6 : pthread_mutex_t control_mutex;
 7 :
 8 : void controller_thread( )
 9 : {
10 :         ...
11 :         //create worker_thread
12 :         pthread_create(&tid2, NULL, requester_thread, NULL);
13 :         //create responser_thread
14 :         pthread_create(&tid3, NULL, responser_thread, NULL);
15 :
16 :         /* control the requester and responser */
17 :         pthread_mutex_lock(&list_mutex);
18 :
19 :         //check the list of request and send out controller message
20 :         pthread_mutex_lock(&request_mutex);
21 :
22 :         /* send message to response_thread */
23 :         pthread_mutex_lock(&control_mutex);
24 :         send_control_message( );
25 :         pthread_mutex_unlock(&control_mutex);
26 :         ...
27 :         pthread_mutex_unlock(&request_mutex);
28 :
29 :         pthread_mutex_unlock(&list_mutex);
30 :         .../* other operations */
31 : }
32 :
33 : #requester_thread, named as T2
34 : void requester_thread( )
35 : {
36 :         pthread_mutex_lock(&list_mutex);
37 :         if (<request_in_list <= 10)
38 :         {
39 :             pthread_mutex_lock(&request_mutex);
40 :             //trigger a new request
41 :             pthread_mutex_unlock(&request_mutex);
42 :                 pthread_mutex_destroy(&request_mutex);
                    < Lock_Could_Be_Removed_From_Graph>
43 :         }
44 :         pthread_mutex_unlock(&list_mutex);
45 : }
46 :
47 : #responser_thread, named as T3
48 : void responser_thread( )
49 : {
50 :         pthread_mutex_lock(&list_mutex);
51 :         pthread_mutex_lock(&control_mutex);
52 :         //handle the control message from controller
53 :         pthread_mutex_unlock(&control_mutex);
54 :         pthread_mutex_destroy(&control_mutex);
                < Lock_Could_Be_Removed_From_Graph>
55 :         pthread_mutex_unlock(&list_mutex);
56 : }
```

It is identified by static scan that function calls that match destroy function of mutual exclusive lock Mutex are pthread_mutex_destroy (&request_mutex) located at line 42 and pthread_mutex_destroy(&control_mutex) located at line 54, respectively. Locations of destroy point corresponding to function call of mutual exclusive lock Mutex are determined based on the result of static scanning, as shown in table 1.

TABLE 1

| lock | location of lock destroy point |
| --- | --- |
| request_mutex | example1.c@<line42_instruction_address> |
| control_mutex | example1.c@<line54_instruction_address> |

Next, marks are added in the vicinity of locations of all destroy points of mutual lock Mutex in parallel programs, so that an event notification that mutual exclusive lock Mutex is no longer used may be triggered based on the added marks during the running procedure of parallel programs, as shown below, mark "<Lock_Could_Be_Removed_From_Graph>" is added after lines 42 and 54 of parallel programs respectively, so that the event notification that mutual exclusive lock is no longer used is triggered by the added marks in the running procedure of parallel programs. In response to receiving the event notification that mutual exclusive lock Mutex is no longer used, it is determined that mutual exclusive lock Mutex is no longer used in the running procedure of parallel programs.

```
 1 :    #controller thread, named as T1
        ......
42 :            pthread_mutex_destroy(&request_mutex);
                < Lock_Could_Be_Removed_From_Graph>
        .......
54 :            pthread_mutex_destroy(&control_mutex);
                < Lock_Could_Be_Removed_From_Graph>
55 :            pthread_mutex_unlock(&list_mutex);
56 :    }
```

Figure 4A:
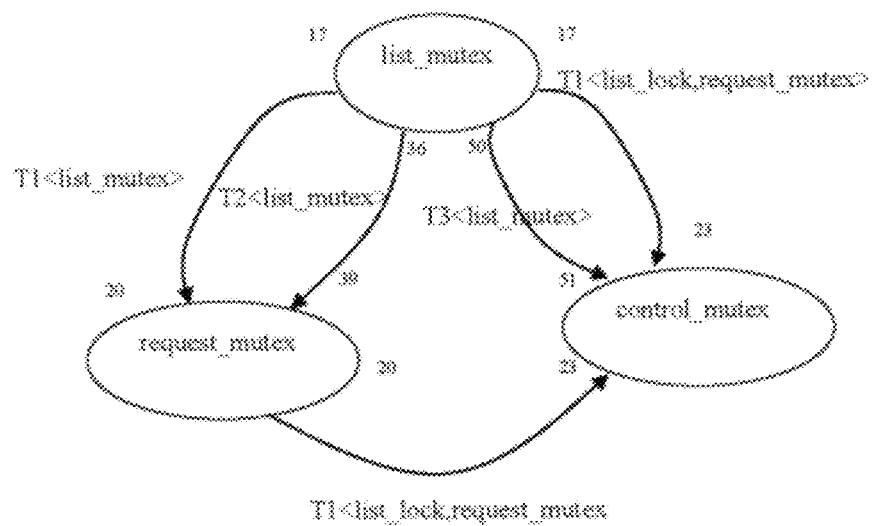
FIG. 4a shows a lock graph of execution procedure of multi-thread parallel programs corresponding to a first embodiment.
Figure 4B:
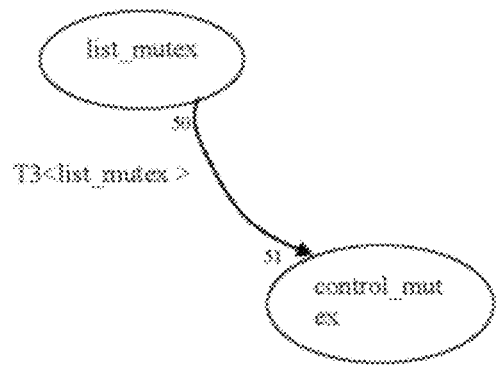
Figure 4C:
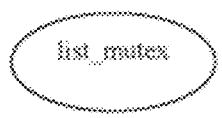
FIG. 4c shows a lock graph after nodes of mutual exclusive lock control_mutex and edges related to mutual exclusive lock control_mutex are deleted from the lock graph of FIG. 4b.

FIG. 4a shows a lock graph of execution procedure of multi-thread parallel programs corresponding to the first embodiment. When the program runs to the location of line 42, nodes of mutual exclusive lock request_mutex, and edges related to mutual exclusive lock request_mutex, are deleted from the lock graph, as shown in FIG. 4b. Next, when the program runs to the location of line 54, nodes of mutual exclusive lock control_mutex, and edges related to mutual exclusive lock control_mutex, are deleted from the lock graph, as shown in FIG. 4c. It can be seen from the simplified lock graph that only one node of mutual exclusive lock list_mutex remains, thus there is no deadlock.

Second Embodiment

An example of static code analysis on a Java language program example2.java without an explicit function call that destroys a lock is shown below.

```
/* main in Example2.java */
01: new T1.start( );
02  new T2.start( );
/* Thread 1, named as T1 */
03: synchronized(G){
04:     synchronized(L1){
05:         synchronized(L2){ }
06:         }
07: };
08: t3 = new T3( );
09: t2.start( );
10: t3.join( );
11: synchronized(L2){
12:   synchronized(L1){ }
13: }
14:
/* Thread 2, named as T2 */
15: synchronized(G){
16:     synchronized(L2){
17:         synchronized(L1){ }
18:         }
19: }
20:
/* Thread 3, named as T3 */
21: synchronized(L1){
22:     synchronized(L2){ }
23: }
24:
```

There is no explicit function call that destroys locks (G, L1 and L2) in the above example of Java language program, thus it is required to analyze the data stream of parallel programs to determine locations in the parallel programs where the lock is defined and used so as to find a set of locations where the lock may be finally used in the running procedure of parallel programs. It is identified through static scan that thread T1 acquires lock G at line 3, releases lock G at line 7; thread 2 acquires lock G at line 15, releases lock G at line 19; thread T4 acquires lock L1 at line 4, releases lock L1 at line 6; thread T1 acquires lock L1 at line 12, releases lock L1 at line 12; thread T2 acquires lock L1 at line 17, releases lock L1 at line 17; thread T3 acquires lock L1 at line 21, releases lock L1 at line 23; thread T1 acquires lock L2 at line 5, releases lock L2 at line 5; thread T1 acquires lock L2 at line 11, releases lock L2 at line 13; thread T2 acquires lock L2 at line 16, releases lock L2 at line 18; and thread T3 acquires lock L2 at line 22, releases the lock at line 22. A set of corresponding locations where locks G, L1 and L2 may be finally used is generated based on the result of the scan, as shown in table 2.

TABLE 2

| lock | set of locations of possible lock destroy points |
| --- | --- |
| G | T1@< line8_instruction_address> |
|   | T2@<line20_instruction_address> |
| L1 | T1@<line13_instruction_address> |
|   | T2@<line18_instruction_address> |
|   | T3@<line24_instruction_address> |
| L2 | T1@<line14_instruction_address> |
|   | T2@<line19_instruction_address> |
|   | T3@<line23_instruction_address> |

Next, as shown below, marks are added in the vicinal locations in the Java program where locks G, L1 and L2 may be finally used, so that an event notification that locks G, L1 and L2 might no longer be used will be triggered based on the added marks in the running procedure of parallel programs. As shown below, marks "<Lock_G_Might_Be_Removed_From_Graph>", "<Lock_L1_Might_Be_Removed_From_Graph>" and"<Lock_L2_Might_Be_Removd_From_Graph>" are added in the vicinal locations where locks (G, L1 and L2) may be finally used. The embodiment of the present invention selects to add marks after locations where locks (G, L1 and L2) may be finally used, nevertheless, those skilled in the art can appreciate that the purpose of the present invention can also be achieved by adding marks before locations where locks may be finally used. During execution of the program, the event notification is triggered by marks, and table 2 is updated in response to receiving the event notification; on different platforms such as Windows, Linux, a different event notification mechanism can be used.

```
/* main in Example2.java */
01: newT1.start( );
02  new T2.start( );
/* Thread 1, named as T1 */
03: synchronized(G){
04:     synchronized(L1){
05:         synchronized(L2){ }
06:     }
07: };
 < Lock_G_Might_Be_Removed_From_Graph >
08: t3 = new T3( );
09: t2.start( );
10: t3.join( );
11: synchronized(L2){
12:   synchronized(L1){ }
 < Lock_L1_Might_Be_Removed_From_Graph >
13: }
 < Lock_L2_Might_Be_Removed_From_Graph >
14:
/* Thread 2, named as T2 */
15: synchronized(G){
16:     synchronized(L2){
17:         synchronized(L1){ }
 < Lock_L1_Might_Be_Removed_From_Graph >
18:     }
 < Lock_L2_Might_Be_Removed_From_Graph >
19: }
 < Lock_G_Might_Be_Removed_From_Graph >
20:
/* Thread 3, named as T3 */
21: synchronized(L1){
22:     synchronized(L2){ }
 < Lock_L2_Might_Be_Removed_From_Graph >
23: }
24: < Lock_L1_Might_Be_Removed_From_Graph >
```

According to the embodiments of the present invention, the following two conditions need to be met when lock G is no longer used: 1) thread T1 proceeds to instruction at line 8; and 2) thread T2 proceeds to instruction at line 20. In practice, when thread T1 first proceeds to instruction at line 8, the mark will trigger an event notification that lock G may no longer be used to update of table 2, "T1@<line8_instruction_address>" will be deleted from table 2, and the updated table 2 is shown in table 3:

TABLE 3

| lock | set of locations where lock may be finally used |
| --- | --- |
| G | T2@<line20_instruction_address> |
| L1 | T1@<line13_instruction_address> |
|   | T2@<line18_instruction_address> |
|   | T3@<line24_instruction_address> |
| L2 | T1@<line14_instruction_address> |
|   | T2@<line19_instruction_address> |
|   | T3@<line23_instruction_address> |

Next, when thread T2 proceeds to instruction at line 20, the mark triggers an event notification that lock G is no longer used and table 3 is updated, in response to receiving the event notification that lock G may no longer be used, "T2@<line20_instruction_address>" in table 3 is deleted, since all the event notifications that lock G may no longer be used triggered by marks of lock G is received, it is determined that lock G is no longer used, and since the set of locations where lock G may be finally used has been updated as null, lock G is deleted from table 3 and lock graph is notified to update, the updated table 3 is shown in table 4:

TABLE 4

| lock | set of locations where lock may be finally used |
| --- | --- |
| L1 | T1@<line13_instruction_address> |
|   | T2@<line18_instruction_address> |
|   | T3@<line24_instruction_address> |
| L2 | T1@<line14_instruction_address> |
|   | T2@<line19_instruction_address> |
|   | T3@<line23_instruction_address> |

Figure 5A:
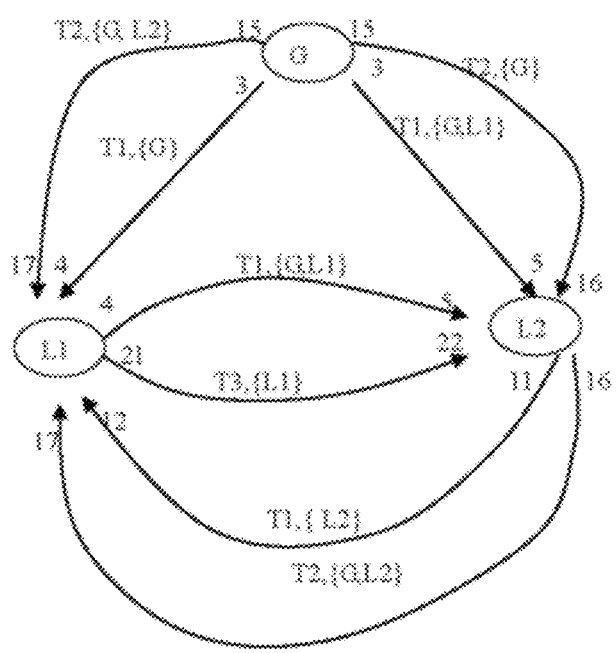
FIG. 5a shows a lock graph of execution procedure of multi-thread parallel programs corresponding to a second embodiment.
Figure 5B:
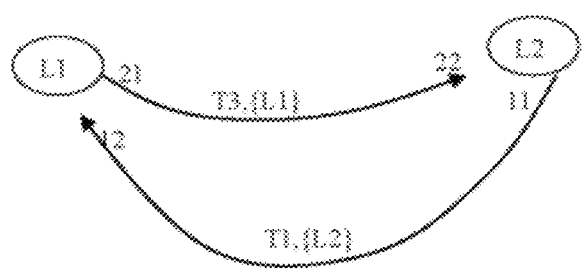

FIG. 5a shows a lock graph of execution procedure of multi-thread program corresponding to the second embodiment, accordingly, nodes of lock G and edges related to lock G are deleted from FIG. 5a. FIG. 5b shows the updated lock graph, and then deadlock detection is performed on the updated lock graph 5b.

The following three conditions need to be met when lock L1 is no longer used: 1) thread T1 proceeds to instruction at line 13; 2) thread T2 proceeds to instruction at line 18; and 3) thread T3 proceeds to instruction at line 24. In practice, when thread T2 first proceeds to instruction at line 18, the mark will trigger an event notification that lock L1 may no longer be used and notify updating table 4, "T2@<line18_instruction_address>" is deleted from table 4, and the updated table 4 is shown in table 5:

TABLE 5

| lcok | set of locations where lock may be finally used |
|------|--------------------------------------------------|
| L1   | T1@<line13_instruction_address>                  |
|      | T3@<line24_instruction_address>                  |
| L2   | T1@<line14_instruction_address>                  |
|      | T2@<line19_instruction_address>                  |
|      | T3@<line23_instruction_address>                  |

Next, when thread T1 proceeds to instruction at line 13, the mark triggers an event notification that lock L1 is no longer used and notify updating table 6, "T1@<line13_instruction_address>" is deleted from table 5, and the updated table 5 is shown in table 6:

| lock | set of locations where lock may be finally used |
|------|--------------------------------------------------|
| L1   | T3@<line24_instruction_address>                  |
| L2   | T1@<line14_instruction_address>                  |
|      | T2@<line19_instruction_address>                  |
|      | T3@<line23_instruction_address>                  |

Finally, when thread T3 proceeds to instruction at line 24, the mark triggers an event notification that lock L1 may no longer be used and updates table 6, in response to receiving the event notification that lock L1 is no longer used, "T3@<line23_instruction_address>" is deleted from table 6, and the updated table 6 is shown in table 7:

TABLE 7

| lock | set of locations where lock may be finally used |
|------|--------------------------------------------------|
| L2   | T1@<line14_instruction_address>                  |
|      | T2@<line19_instruction_address>                  |
|      | T3@<line23_instruction_address>                  |

Figure 5C:
FIG. 5c shows a lock graph after nodes of lock L1 and edges related to lock L1 are deleted from the lock graph of FIG. 5b.

Since all the event notifications that lock L1 may no longer be used are received, it is determined that lock L1 is no longer used, accordingly, nodes of lock L1 and edges related to lock L1 are deleted from FIG. 5b. FIG. 5c shows the updated lock graph, and then deadlock detection is performed on the updated lock graph 5c.

The above two embodiments of the present invention implements analysis of lock lifecycle with static code scan, however, it is not limited thereto. Those skilled in the art can appreciate that code scan may also be performed in the running procedure of parallel programs so as to implement analysis of lock lifecycle.

According to another embodiment of the invention, for a runtime environment that supports garbage collection, a garbage collection notification mechanism provided by virtual machine can be used to determine that a lock is no longer used. Garbage collection (GC), or referred to as memory garbage collection, is a common automatic memory management technique. A garbage collector attempts to reclaim memory space used by objects which may no longer be used by the objects. For example, when a program de-references an object, memory space allocated for that object can be reclaimed. Since the runtime environment can provide a notification mechanism when an object is reclaimed, the object used as a lock that requires to be notified when reclaimed by GC can be registered in the runtime environment. In response to detecting that locks are reclaimed in the running procedure of parallel programs, i.e., receiving an event notification issued from the runtime environment that locks are reclaimed, it is determined that these locks are no longer used.

Third Embodiment

An example of dynamically analyzing byte code of Java language program Example 3.java running on a JVM (Java virtual machine) by using garbage collection is shown below.

```
/* main in Example3.java */
1:
2:
3: new T1( ).start( ); // start thread T1
4:
5: T1:
6:
7: synchronized(G) {
8:          synchronized(L1) {
9:                   synchronized(L2) {
10:         }
11: }
12: new T2( ).start( ); // start thread T2
13: ...
14://lock G is garbage collected at this moment
15:
16: T2:
17:
18: synchronized(L1) {
19:         synchronized(L2) { }
20: }
21: ...
22//lock L1 is garbage collected at this moment
```

Figure 6A:
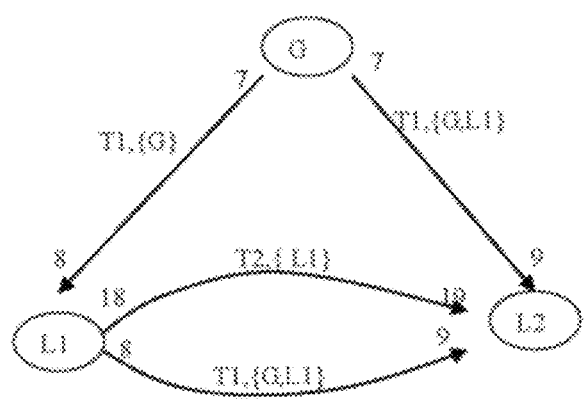
FIG. 6a shows a lock graph of byte code in a Java program running on a Java virtual machine (JVM) corresponding to a third embodiment.
Figure 6B:
Figure 6C:
FIG. 6c shows a lock graph after nodes of lock L1 and edges related to lock L1 are deleted from FIG. 6b.

First, objects of locks G, L1 and L2 that require to be notified when reclaimed by GC are registered on the virtual machine, in response to receiving an event notification issued from JVM that lock G is reclaimed. When the Java program proceeds to instruction at line 14, it is determined that lock G is no longer used. FIG. 6a shows a lock graph of Java program running on JVM corresponding to the third embodiment, nodes of lock G and edges related to lock G are deleted from the lock graph of FIG. 6a. FIG. 6b shows the updated lock graph after nodes of lock G and edges related to lock G are deleted from FIG. 6a, and then deadlock detection is performed on the updated lock graph 6b. In response to receiving an event notification issued from JVM that lock L1 is reclaimed when the Java program proceeds to instruction at line 22 on JVM, it is determined that lock L1 is no longer used, and nodes of lock L1 and edges related to lock L1 are deleted from FIG. 6b. FIG. 6c shows the updated lock graph after nodes of lock L1 and edges related to lock L1 are deleted from FIG. 6b, and then deadlock detection is performed on the updated lock graph 6c.

According to another embodiment of the present invention, for a runtime environment that supports garbage collection, static code analysis before running of parallel programs can be combined with dynamic analysis during the running procedure of parallel programs (garbage collection notification mechanism) to determine that a lock is no longer used. For certain application program, some locks may have a lot of locations where they could be finally used, e.g. hundreds of locations, thus scanning all the code consume large amounts of time and computing resources. It is relatively difficult to efficiently determine that these locks are no longer used solely by relying on static code analysis, in order to more efficiently determine that these locks are no longer used. Locks that need to be dynamically analyzed may be filtered first through static code analysis, and then the garbage collection notification mechanism can be utilized in the running procedure of the program to determine that the locks are no longer used. The manner of combining static analysis with dynamic analysis can improve efficiency of deadlock detection. An example of analyzing Java language source code Example 2.java in the above second embodiment by using a manner of combining static analysis with dynamic analysis is shown below. Although the embodiment of the present invention runs by incorporating Java virtual machine (JVM) within the scope of JVM defined by Java standard specification, JVM may also be any type of virtual machine that is independent of platform, e.g., C#, Smalltalk, Ruby, D language, nuva, and it is not limited to a Java virtual machine.

Fourth Embodiment

According to the set of locations where locks G, L1 and L2 may be finally used in table 2 in the above second embodiment, the lock with more locations where it may be finally used is found (e.g. lock L1) to perform dynamic scan. Lock L1 and its corresponding set of locations where it may be finally used are deleted from table 2, and lock L1 that requires to be notified of garbage collection is registered on JVM. The locations that locks G and L2 may be finally used in table 2 are updated in the running procedure of parallel programs by the static code analysis method of the second embodiment, so as to determine that locks G and L2 are no longer used in the running procedure of parallel programs, accordingly, nodes of locks G and L2 and edges related to locks G and L2 are deleted from the lock graph. Meanwhile, during running of parallel programs, in response to receiving an event notification that L1 is reclaimed by GC when Java program proceeds to a certain location such as line 20, it is determined that lock L1 is no longer used, and nodes of lock L1 and edges related to lock L1 are deleted from the corresponding lock graph.

Figure 7:
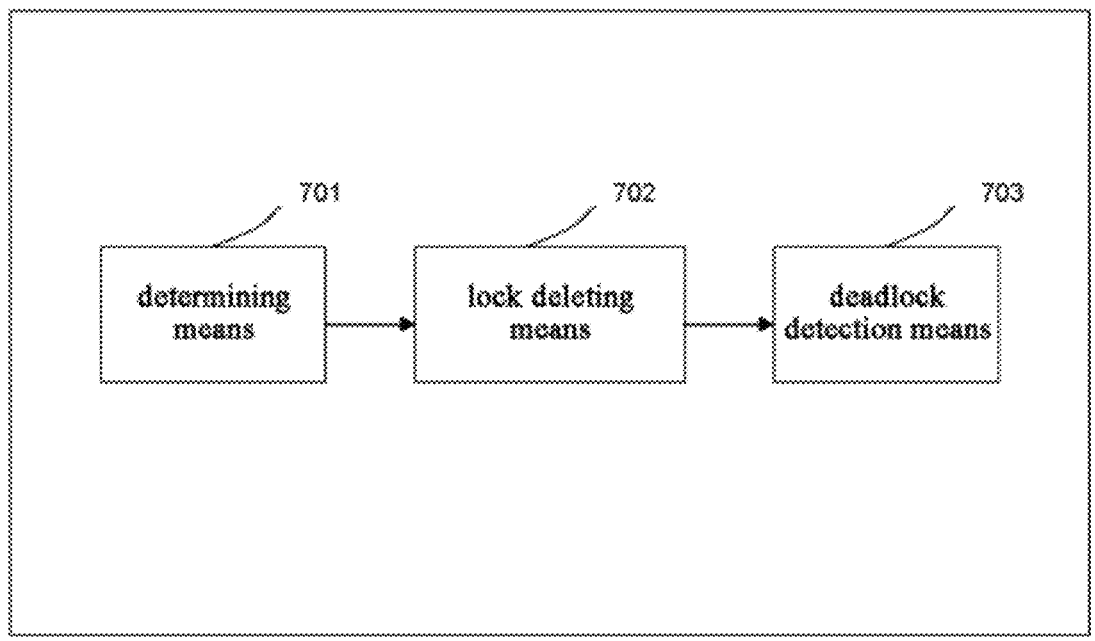
FIG. 7 shows a block diagram of a deadlock detection system for parallel programs according to an embodiment of the present invention.

Based on the same inventive concept, the present invention also provides a deadlock detection system for parallel programs. FIG. 7 shows a block diagram of the deadlock detection system for parallel programs according to an embodiment of the present invention. As shown, the deadlock detection system for parallel programs comprises: a determining means 701 configured to determine that a lock of the parallel programs is no longer used in the running procedure of the parallel programs; a lock deleting means 702 configured to delete a node corresponding to the lock that is no longer used, and edges relating to the lock that is no longer used, from a corresponding lock graph to generate an updated lock graph, wherein the lock graph is constructed according to lock operation of the parallel programs; and a deadlock detection means 703 is configured to perform deadlock detection on the updated lock graph.

The determining means 701 is further configured to: in response to receiving event notifications that a lock of the parallel programs is no longer used, determining in the running procedure of the parallel programs that the lock of the parallel programs is no longer used.

The determining means 701 further comprises: a lock lifecycle analyzing means configured to analyze a lifecycle of the lock of the parallel programs by scanning code of the parallel programs.

According to one embodiment of the present invention, the lock lifecycle analyzing means is further configured to: identify a set of locations where the lock of the parallel programs may be finally used in the running procedure of the parallel programs. Further, the lock lifecycle analyzing means is configured to: in response to detecting that there is no function call in the parallel programs that destroys a lock, analyze data stream of the parallel programs, determine a location where the lock of the parallel programs is defined and used, so as to find the set of locations where the lock of the parallel programs may be finally used in the running procedure of the parallel programs. Further, the lock lifecycle analyzing means is configured to: add marks in the vicinity of locations that the lock of the parallel programs may be finally used. The marks are used to trigger, in the running procedure of the parallel programs, an event notification that the lock of the parallel programs may no longer be used. Further, the determining means 701 is configured to: in response to receiving all the event notifications that the lock of the parallel programs may no longer be used as triggered by the mark, determine that the lock of the parallel programs is no longer used.

The determining means is further configured to: in response to detecting that lock of the parallel programs is reclaimed by GC in the running procedure of the parallel programs, identify that the lock of the parallel programs is no longer used.

According to one embodiment of the present invention, the lock lifecycle analyzing means is further configured to: in response to detecting that there is a function call in the parallel programs that destroys a lock, identify a location where the lock is finally used in the running procedure of the parallel programs. Further, the lock lifecycle analyzing means is configured to: add marks in the vicinity of the location where the lock is finally used so as to trigger, in the running procedure of the parallel programs, event notifications that the lock of the parallel programs is no longer used.

According to one embodiment of the present invention, the determining means is further configured to: in response to detecting that a lock of the parallel programs is reclaimed as garbage in the running procedure of the parallel programs, identify that the lock of the parallel programs is no longer used.

With the method and system of detecting deadlocks in parallel programs of the embodiments of the present invention, directed loop detection is performed based on a pruned lock graph to determine whether there is a potential deadlock, which can save a large amount of time and computing resources. Assume that a lock graph of a parallel program has N nodes and E edges, the algorithm of checking direction loop in the lock graph is divided into the following two steps: 1. find all strongly connected components in the lock graph, the complexity of the algorithm is O(N+E); 2. find all directed loops in each of the strongly connected components, the complexity of the algorithm is O(N2). Thus, the complexity of the entire algorithm is O(N2+E). It can be seen that the reduced number of nodes greatly degrades the complexity of the algorithm, and improves the efficiency of deadlock detection.

It should be appreciated that at least some aspects of the invention may be alternatively embodied as a program product. A program defining functions related to the present invention may be transferred to a data storage system or computer system through a variety of signal bearing medium, which includes but not limited to, non-writable memory medium (e.g. CD-ROM), writable memory medium (e.g. floppy disk, hard driver, read/write CD ROM, optical medium) and communication medium such as a computer including Ethernet and a telephone network. Thus, it should be appreciated that, in such signal bearing medium, when carrying or encoding computer readable instructions for managing method functions in the present invention therein, it represents an alternative embodiment of the invention. The present invention may be implemented in hardware, software, firmware or a combination thereof. The present invention may be implemented in a single computer system in a centralized manner or in a distributed manner. In such distributed manner, different parts are distributed across several interconnected computer systems. Any computer system or other apparatus adapted to perform the method described herein is suitable. Preferably, the present invention is implemented in a combination of computer software and general-purpose computer hardware. In such implementation, when loaded and executed, the computer program will control the computer system to perform the method of the present invention or compose the system of the present invention.

The foregoing description of the preferred embodiments of the invention has been presented for purposes of illustration. It is not intended to be exhaustive or to limit the invention to the precise form disclosed; many modifications and variations are possible in light of the above teaching. It is apparent to those skilled in the art that such modifications and variations are encompassed within the scope of the invention as defined by the appended claims.

What is claimed is:

1. A computer implemented method for deadlock detection of parallel programs, comprising:
    identifying a set of locations where the lock of the parallel programs may be finally used in the running procedure of the parallel programs;
    adding marks in the vicinity of locations that the lock of the parallel programs may be finally used, wherein the marks are used to trigger, in the running procedure of the parallel programs, event notifications that the lock of the parallel programs may no longer be used;
    in response to receiving all event notifications that the lock of the parallel programs may no longer be used as triggered by the marks, determining, by the computer, that a lock of the parallel programs is no longer used in a running procedure of the parallel programs;
    deleting, by the computer, a node corresponding to the lock that is no longer used, and edges relating to the lock that is no longer used, from a lock graph corresponding to the running procedure of the parallel programs to acquire an updated lock graph, wherein the lock graph is constructed according to lock operations of the parallel programs; and
    performing deadlock detection on the updated lock graph by the computer.

2. The computer implemented method according to claim 1, wherein determining that a lock of the parallel programs is no longer used in the running procedure of the parallel programs further comprising:
    in response to receiving an event notification that a lock of the parallel programs is no longer used, determining that a lock of the parallel programs is no longer used.

3. The computer implemented method according to claim 2, wherein determining a lock of the parallel programs is no longer used in the running procedure of the parallel programs further comprising:
    analyzing a lifecycle of the lock of the parallel programs by scanning code of the parallel programs.

4. The computer implemented method according to claim 3, wherein analyzing the lifecycle of the lock of the parallel programs further comprising:
    in response to detecting that there is a function call in the parallel programs that destroys a lock, identifying a location where the lock of the parallel programs is finally used in the running procedure of the parallel programs.

5. The computer implemented method according to claim 4, further comprising:
    adding marks in the vicinity of the location where the lock of the parallel programs is finally used, wherein the marks are used to trigger, in the running procedure of the parallel programs, event notifications that the lock of the parallel programs is no longer used.

6. The computer implemented method according to claim 1, wherein identifying the set of locations where the lock of the parallel programs may be finally used in the running procedure of the parallel programs further comprising:
    in response to detecting that there is no function call in the parallel programs that destroys a lock, analyzing a data stream of the parallel programs, determining a location where the lock of the parallel programs is defined and used in order to identify the set of locations where the lock of the parallel programs may be finally used in the running procedure of the parallel programs.

7. The computer implemented method according to claim 1, wherein determining that the lock of the parallel programs is no longer used in the running procedure of the parallel programs further comprising:
    in response to detecting that the lock of the parallel programs is reclaimed by a garbage collection process in the running procedure of the parallel programs, identifying that the lock of the parallel programs is no longer used.

* * * * *